Figure 6:
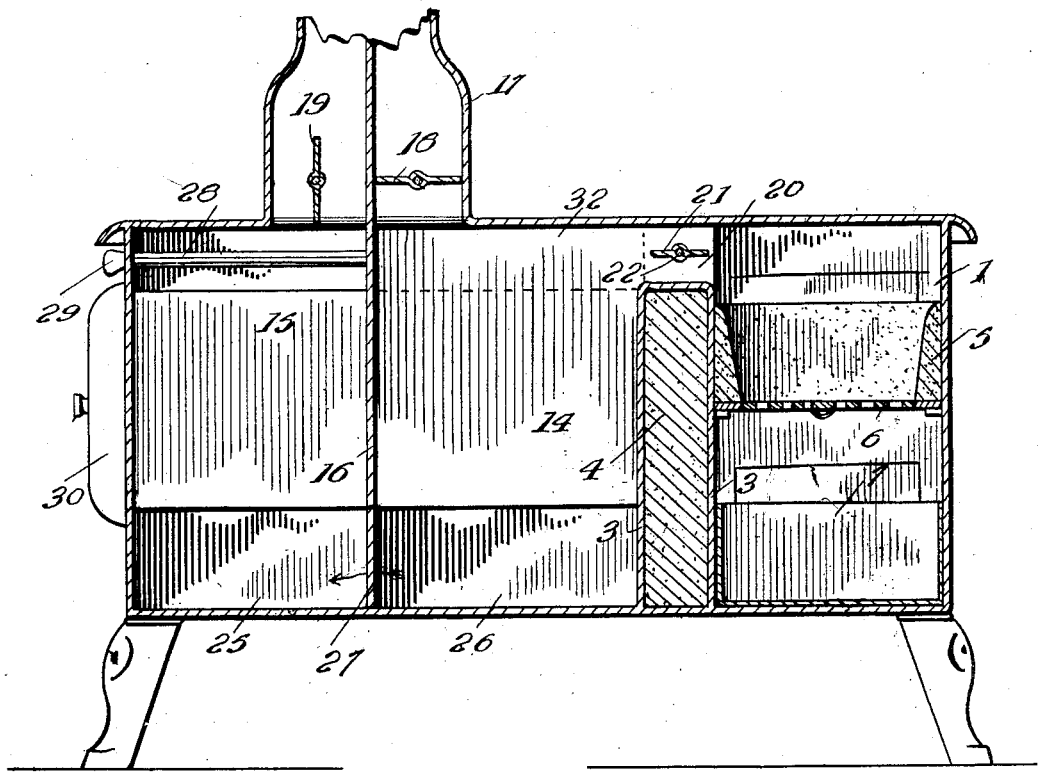

No. 829,075. PATENTED AUG. 21, 1906.
O. S. LANDERS.
COMBINED COOKING AND HEATING STOVE.
APPLICATION FILED APR. 15, 1905.
3 SHEETS—SHEET 1.
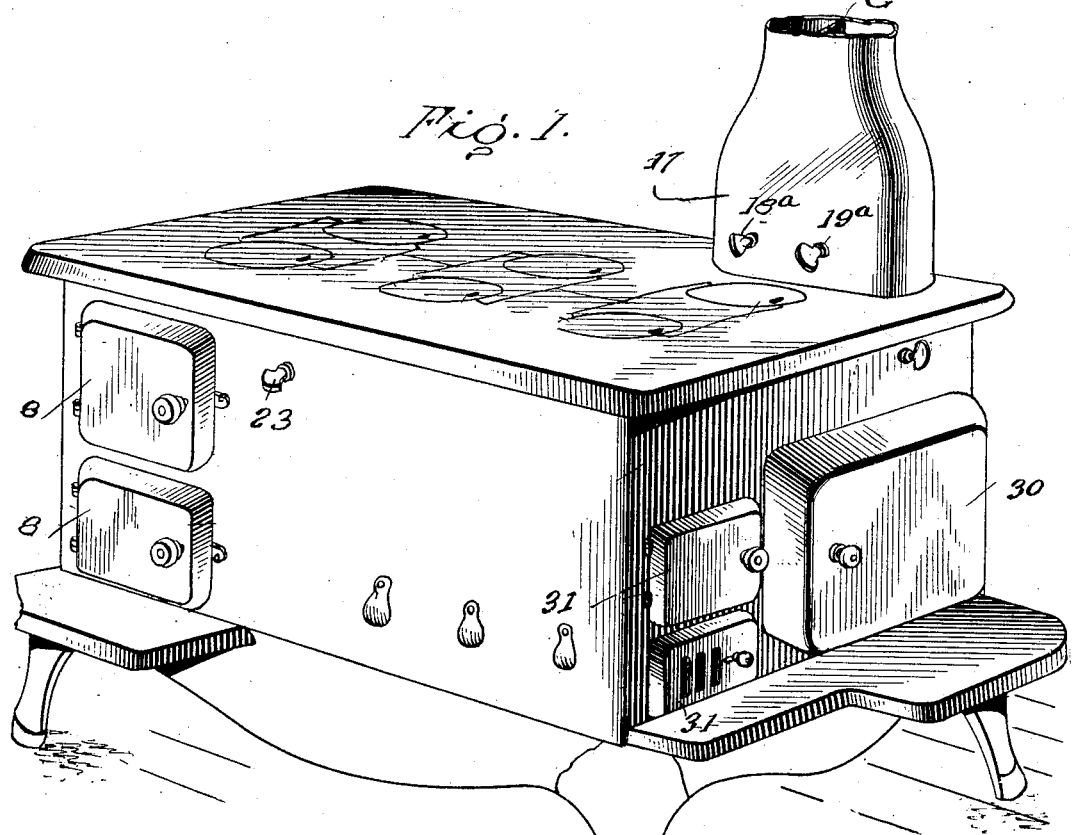
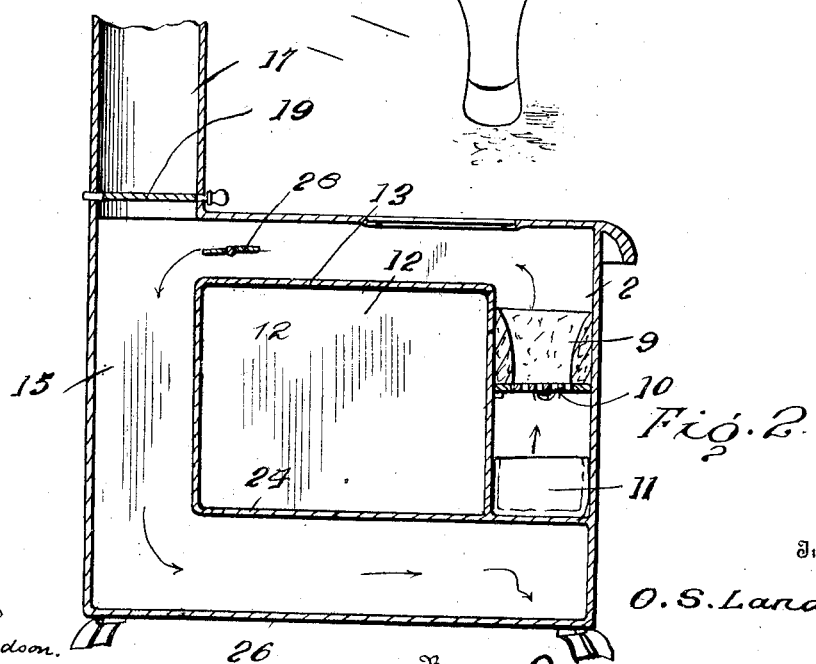
Witnesses
W. N. Woodson.
J. H. Johnston.
Inventor
O. S. Landers.
By R. H. A. Race, Attorneys

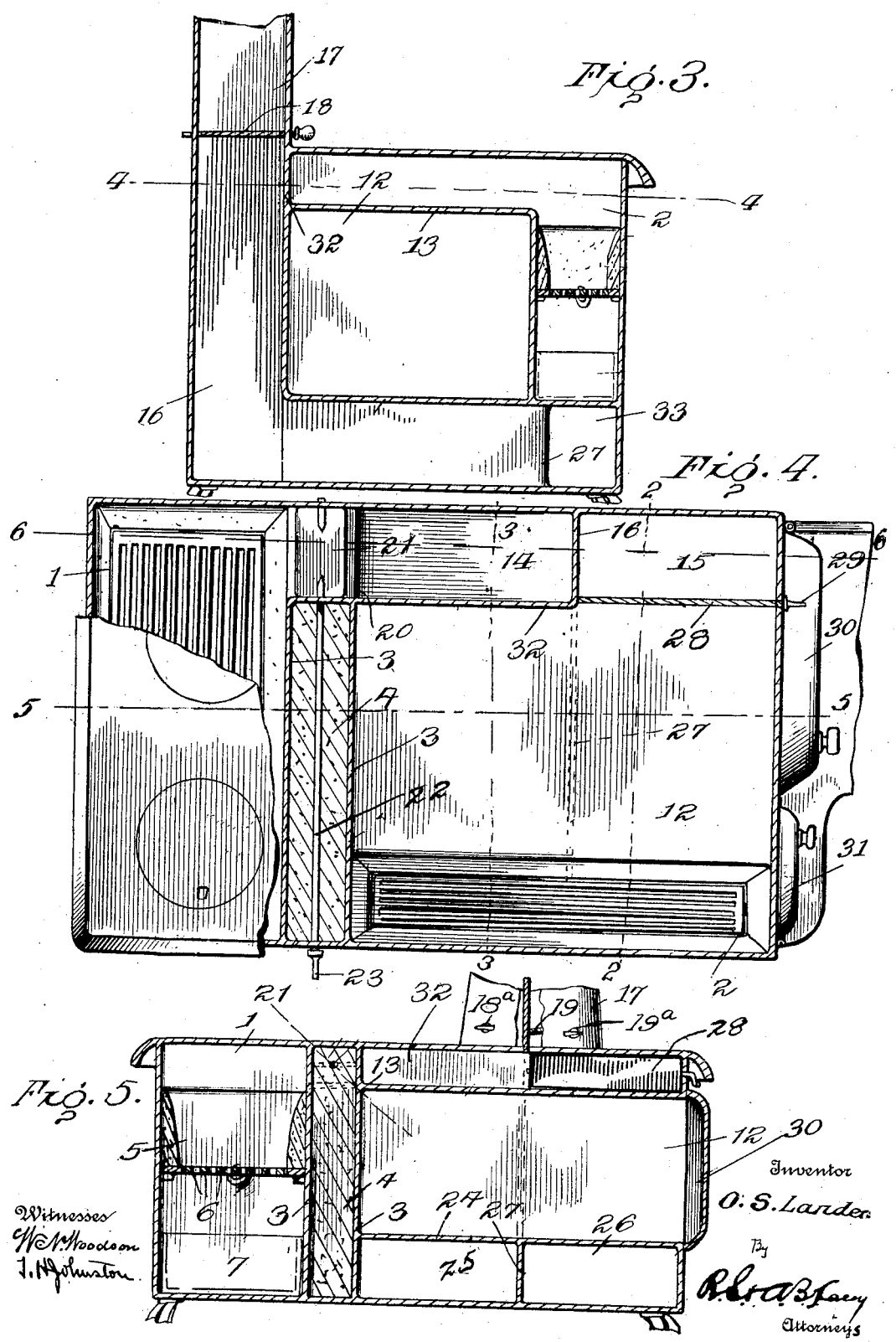

No. 829,075. PATENTED AUG. 21, 1906.
O. S. LANDERS.
COMBINED COOKING AND HEATING STOVE.
APPLICATION FILED APR. 15, 1905.

3 SHEETS—SHEET 3.

Witnesses
A. B. Williams
E. Bradley

Inventor
O. S. Landers.

By H. W. Lacey, Attorney

UNITED STATES PATENT OFFICE.

OMER S. LANDERS, OF LIVERMORE, COLORADO.

COMBINED COOKING AND HEATING STOVE.

No. 829,075.　　　　　Specification of Letters Patent.　　　　Patented Aug. 21, 1906.

Application filed April 15, 1905. Serial No. 255,805.

*To all whom it may concern:*

Be it known that I, OMER S. LANDERS, a citizen of the United States, residing at Livermore, in the county of Larimer and State of Colorado, have invented certain new and useful Improvements in a Combined Cooking and Heating Stove, of which the following is a specification.

My invention relates to certain new and useful improvements in ranges, and aims to provide a construction in which dual functions of a heater and cooker may be performed either independent of one another or in combination.

With the above object in view the invention comprises a novel and advantageous arrangement of heating-chambers, passages, and ovens, together with necessary fire-boxes and dampers.

In describing the detailed construction of my range reference is to be had to the accompanying drawings, forming a part of this specification, in which—

Figure 1 is a perspective view of a stove embodying the invention. Fig. 2 is a section on the line 2 2 of Fig. 4. Fig. 3 is a section on the line 3 3 of Fig. 4. Fig. 4 is a section on the line 4 4 of Fig. 3, a portion of the stove-top being shown in plan view. Fig. 5 is a section on the line 5 5 of Fig. 4. Fig. 6 is a section on the line 6 6 of Fig. 4.

Corresponding and like parts are referred to in the following description and indicated in all the views of the drawings by the same reference characters.

The body of the range is provided with two combustion-chambers 1 and 2, the chamber or compartment 1 serving as a heater, while the chamber or compartment 2 forms a cooker. The two compartments 1 and 2 are separated by a wall composed of a pair of vertical transverse partitions 3, spaced apart to receive a filling 4 of fire-brick or similar refractory material therebetween. The chamber 1 has an ordinary fire-box 5, grate 6, and ash-pit 7, suitable doors 8 being provided at the front of the range to admit of ready access to the compartment 1 aforesaid. The chamber 1 extends from the back to the front of the stove at one end thereof, while the combustion-chamber 2 is located at the front of the stove extending from one end to the wall composed of the partitions 3 and filling 4. The chamber or compartment 2 is likewise provided with a suitable fire-box 9, grate 10, and ash-pit 11, all of which extend, of course, at approximately a right angle to the similar parts in the combustion-chamber 1.

The oven of the range is indicated at 12 and is located in rear of the combustion-chamber 2 and at one side of the combustion-chamber 1. The partitions 3 separate the oven from the latter. The top 13 of the oven 12 is spaced from the top of the range or stove, and in rear of the oven are located two vertical flues 14 and 15, separated by means of a vertical partition 16. The partition 16 extends from the bottom of the stove to the top thereof, and both of the flues 14 and 15 communicate with the smoke-pipe 17 at the rear portion of the range. Suitable dampers 18 and 19 are adapted to close the upper ends of the flues 14 and 15, respectively, to cut off communication between said flues and the pipe 17. The dampers 18 and 19 are operable by suitable handles 18ª and 19ª, respectively. The combustion-chamber 1, which constitutes the heater, is connected with the upper end of the flue 14 by means of a horizontal flue 20, which leads from the rear upper end of the chamber 1 into one end of the flue 14, said flue 20 being of a length substantially the same as the width or thickness of the wall formed by the partitions 3 and the filling 4. A damper 21 is arranged in the flue 20 for movement about a horizontal axis and is operated by means of a damper-rod 22, which is connected at its rear end with the damper 21 and which passes through the filling 4, being provided with a suitable handle 23 at its outer end, said handle being situated at the front of the stove.

The bottom 24 of the oven 12 is spaced from the bottom of the stove, and flues 25 and 26 lead from the front of the stove to the back thereof. The horizontal flues 25 and 26 communicate at the rear ends thereof with the vertical flues 14 and 15, respectively, and said flues 25 and 26 are separated by a vertical partition 27. The upper end of the flue 15 communicates with the space between the top 13 of the oven and the top of the stove, but is adapted to be cut off from such communication by means of a damper 28, arranged parallel with the back of the stove and operable by a suitable handle 29, which is located at the end of the stove, which has the door 30 mounted thereon.

The door 30 admits of access to the oven 12, and situated near the door 30 are doors 31, by which access may be had to the combustion-chamber 2. The vertical flue 14, however, does not communicate at its upper end with the space between the top 13 of the oven and the top of the stove, being separated from such space by means of a vertical partition 32, which virtually forms a continuation of the back of the oven. The ends of the partition 32 are connected with the vertical partition 16 and the rear end of the adjacent partition 3.

When the range is used as a cook-stove, the products of combustion from the chamber 2 are made to travel entirely around the oven by closing the damper 19 and opening the damper 18, whereby the smoke or products of combustion will first pass over the top of the oven, down the flue 15 at the back of the stove, thence through the flue 26 to the front of the stove. The flue 26 communicates with flue 25 at the front ends of said flues, as the partition 27 is cut away at this portion to form an opening 33, (shown in Fig. 3,) and thus the heat and products of combustion will pass into horizontal flue 25 to the back of the stove into the bottom of flue 14 and then up said flue into the smoke-pipe 17. The flues 25 and 26 being in communication virtually constitute a single indirect passage, being described as separate, however, to make the construction appear more clearly. It is obvious that each vertical exit-flue in rear of the oven is directly connected with one of the combustion-chambers and that the direct exit-flue of one of the chambers is the indirect exit-flue of the other combustion-chamber. The circulation of the heat around the oven in the above manner is particularly advantageous for baking purposes. Should it not be desired to have such an intense degree of heat as will be secured by the above arrangement of dampers, the damper 18 may be closed and the damper 19 opened, this permitting the products of combustion to pass to the flue 15 and thence up into the smoke-pipe 17, merely going over the top of the oven instead of around the same. Should it be desired to use the range as a heater only, the fire may be kindled in the chamber or compartment 1 and the damper 21 may be opened, so that the products of combustion can pass through the flue 14 and thence up the smoke-pipe 17, if the damper 18 is open. If the damper 18 is closed, then the heat from the chamber 1 will pass down flue 14, through flue 25 to flue 26, and up flue 15. The damper 19 being open, the heat and products of combustion will then pass to the smoke-pipe 17 from flue 15, having made a circuit around the oven.

In starting the fire or when a strong draft is otherwise desirable it is preferable that the dampers 21 and 18 be open, so that a direct draft may be secured. Such an arrangement of the dampers would be desirable also in burning wood containing a large percentage of pitch in order to prevent a large accumulation of soot.

To use the range as a combination heater and cooker, the fires could be kindled in both of the combustion-chambers 1 and 2 and the dampers all opened with the exception of damper 18. A maximum intensity of the heat could thus be generated.

Having thus described the invention, what is claimed as new is—

1. A range of the type described embodying an oven, separate combustion-chambers for heating said oven, independent vertical flues at one side of the oven, heating-passages beneath the oven, said heating-passages so communicating with each other as to virtually form a single indirect passage and each being in communication with one of the vertical flues, the arrangement being such that heat generated in either of the combustion-chambers may be caused to pass through one of the vertical flues to the passage below the oven in communication therewith, from said passage to the second adjacent passage below the oven and from the second passage to the second vertical flue, and a smoke-pipe connected with both of the vertical flues.

2. A range of the class described embodying an oven, separate combustion-chambers for heating said oven, separate vertical flues at one side of the oven, separate passages beneath the oven in communication with each other so as to virtually form a single indirect passage, each of said passages being in communication with one of the vertical flues, a smoke-pipe connected with both of the vertical flues, and dampers controlling the connections between the smoke-pipe and the vertical flues, the vertical flues and the passages below the oven being so arranged that heat generated in either combustion-chamber may be caused to pass through one of the vertical flues to the lower passage in communication therewith, from said lower passage to the second lower passage, and from the last-mentioned lower passage up the second vertical flue to the smoke-pipe.

3. In a range of the type set forth, the combination of an oven, the combustion-chambers 1 and 2 for heating said oven, the vertical flues 14 and 15 in rear of the oven, the passages 25 and 26 beneath the oven in communication with each other so as to virtually form a single indirect passage and in communication with the flues 14 and 15 respectively, the flue 20 connecting the chamber 1 with the flue 14, the damper 21 controlling the connection between the chamber 1 and the flue 14, the smoke-pipe 17 connected with the flues 14 and 15, and the partition 32 separating the upper end of the flue 14 from the space between the top of the range and the oven to cause heat to pass from the chamber 2 over the oven to the flue 15.

4. In a range of the type set forth, the combination of an oven, the combustion-chambers 1 and 2 for heating said oven, the vertical flues 14 and 15 in rear of the oven, the passages 25 and 26 beneath the oven in communication with each other so as to virtually form a single indirect passage and in communication with the flues 14 and 15 respectively, the horizontal flue 20 connecting the chamber 1 with the flue 14, the damper 21 controlling the connection between the chamber 1 and flue 14, the smoke-pipe 17 connected with the flues 14 and 15, the partition 32 separating the upper end of flue 14 from the space between the top of the oven to cause heat to pass from the chamber 2 over the oven to the flue 15, the dampers 18 and 19 governing the points of communication of the flues 14 and 15 with the smoke-pipe 17, and the damper 28 adapted to cut off communication between the space above the oven and the flue 15.

5. In a range, the combination of independent combustion-chambers, independent exit-flues, an oven, a passage beneath said oven, a direct passage from one of the combustion-chambers to one of the exit-flues, a direct passage from the other combustion-chamber to the other exit-flue, and indirect passages from the combustion-chambers through the passage beneath the oven to the exit-flues, and dampers for controlling the exit-flues, the direct exit-flue of each of the combustion-chambers being the indirect exit-flue of the other combustion-chamber.

In testimony whereof I affix my signature in presence of two witnesses.

OMER S. LANDERS. [L. S.]

Witnesses:
 THANE E. SCHUREMAN,
 FRANK E. MILLER.